(12) United States Patent
Krishnamurthy et al.

(10) Patent No.: US 7,233,571 B1
(45) Date of Patent: Jun. 19, 2007

(54) CONNECTION-BASED BANDWIDTH UTILIZATION

(75) Inventors: Chandrasekar Krishnamurthy, Sunnyvale, CA (US); Krishna Sundaresan, Sunnyvale, CA (US); Mahash Chellappa, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1012 days.

(21) Appl. No.: 10/025,265

(22) Filed: Dec. 18, 2001

(51) Int. Cl.
*H04J 1/16* (2006.01)

(52) U.S. Cl. .................. 370/236; 379/88.17; 709/203

(58) Field of Classification Search ............ 370/395.1, 370/395.43, 232, 395.2, 468, 230, 235, 236; 379/220.01, 88.17; 398/45, 118, 110; 709/223, 709/203; 359/165; 397/88.17
See application file for complete search history.

(56) References Cited

U.S. PATENT DOCUMENTS

| | | | | |
|---|---|---|---|---|
| 4,703,475 A | 10/1987 | Dretzka et al. | ............. | 370/394 |
| 5,153,877 A | 10/1992 | Esaki et al. | .................. | 370/389 |
| 5,224,099 A | 6/1993 | Corbalis et al. | ............ | 370/412 |
| 5,274,643 A | 12/1993 | Fisk | .......................... | 370/238 |
| 5,313,454 A | 5/1994 | Bustini et al. | ............... | 370/231 |
| 5,341,366 A | 8/1994 | Soumiya et al. | ............ | 370/233 |
| 5,359,592 A | 10/1994 | Corbalis et al. | ............ | 570/233 |
| 5,359,593 A | 10/1994 | Derby et al. | ................. | 370/234 |
| 5,361,259 A | 11/1994 | Hunt et al. | .................. | 370/402 |
| 5,420,857 A | 5/1995 | Jurkevich | ................... | 370/409 |
| 5,422,880 A | 6/1995 | Heitkamp et al. | ........... | 370/352 |
| 5,483,526 A | 1/1996 | Ben-Nun et al. | ........ | 370/395.7 |
| 5,561,663 A | 10/1996 | Klausmeier | .................. | 370/468 |
| 5,617,417 A | 4/1997 | Sathe et al. | .................. | 370/394 |
| 5,687,167 A | 11/1997 | Bertin et al. | ................. | 370/254 |
| 5,729,546 A | 3/1998 | Gupta et al. | ................. | 370/434 |
| 5,764,626 A | 6/1998 | VanDervort | ................. | 370/232 |
| 5,793,744 A | 8/1998 | Kanerva et al. | ............. | 370/209 |
| 5,815,492 A | 9/1998 | Berthaud et al. | ........... | 370/234 |
| 5,872,771 A | 2/1999 | Park et al. | ................... | 370/252 |
| 5,881,049 A | 3/1999 | Beshai et al. | .......... | 370/395.21 |
| 5,898,691 A | 4/1999 | Liu | ............................ | 370/415 |
| 5,917,804 A | 6/1999 | Shah et al. | .................. | 370/230 |
| 5,926,475 A | 7/1999 | Saldinger et al. | ............ | 370/394 |
| 5,936,940 A | 8/1999 | Marin et al. | ................. | 370/232 |
| 5,940,372 A | 8/1999 | Bertin et al. | ................. | 370/238 |

(Continued)

FOREIGN PATENT DOCUMENTS

WO  WO 99/65194 A1  12/1999

OTHER PUBLICATIONS

Saltouros, Marios P., et al., "A Scalable Qos-Based Routing Scheme for ATM Networks Using Reinforcement Learning Algorithms," University of Athens, Greece (1999).

(Continued)

*Primary Examiner*—John Pezzlo
(74) *Attorney, Agent, or Firm*—Blakely, Sokoloff, Taylor & Zafman LLP

(57) ABSTRACT

A way to provide connection-based bandwidth utilization is disclosed. A connection is provided between a plurality of clients in the network environment. The connection is between the plurality of clients by a plurality of nodes through a plurality of trunks. The utilization capacity of the plurality of trunks is automatically adjusted using standards-based signaling.

42 Claims, 10 Drawing Sheets

ATM signaling protocol stack

U.S. PATENT DOCUMENTS

| | | | |
|---|---|---|---|
| 5,970,067 A | 10/1999 | Sathe et al. ................. | 370/394 |
| 6,028,840 A | 2/2000 | Worster ...................... | 370/230 |
| 6,041,039 A | 3/2000 | Kilkki et al. ............... | 370/230 |
| 6,052,385 A | 4/2000 | Kanerva et al. ............ | 370/468 |
| 6,061,348 A | 5/2000 | Castrigno et al. .......... | 370/363 |
| 6,084,858 A | 7/2000 | Matthews et al. .......... | 370/238 |
| 6,115,374 A | 9/2000 | Stonebridge et al. ....... | 370/362 |
| 6,160,808 A | 12/2000 | Maurya ...................... | 370/389 |
| 6,167,030 A | 12/2000 | Kilkki et al. ............... | 370/236 |
| 6,222,824 B1 | 4/2001 | Marin et al. ................ | 370/230 |
| 6,256,309 B1 | 7/2001 | Daley et al. ........... | 370/395.43 |
| 6,356,546 B1 | 3/2002 | Beshai et al. | |
| 6,466,582 B2 | 10/2002 | Venters et al. | |
| 6,490,249 B1 * | 12/2002 | Aboul-Magd et al. ...... | 370/232 |
| 6,493,317 B1 | 12/2002 | Ma | |
| 6,496,504 B1 | 12/2002 | Malik | |
| 6,512,769 B1 | 1/2003 | Chui et al. ............. | 370/395.41 |
| 6,526,060 B1 | 2/2003 | Hughes et al. ........... | 370/395.4 |
| 6,529,498 B1 | 3/2003 | Cheng ........................ | 370/351 |
| 6,608,813 B1 | 8/2003 | Chiussi et al. ............. | 370/218 |
| 6,608,815 B1 | 8/2003 | Huang et al. ............... | 370/232 |
| 6,625,155 B1 | 9/2003 | Dziong .................... | 370/395.2 |
| 6,678,264 B1 | 1/2004 | Gibson ....................... | 370/352 |
| 6,690,671 B1 * | 2/2004 | Anbiah et al. ......... | 370/395.43 |
| 6,724,881 B1 * | 4/2004 | McAllister et al. .... | 379/220.01 |
| 6,731,599 B1 | 5/2004 | Hunter et al. ............... | 370/229 |
| 6,747,972 B1 | 6/2004 | Lenoski et al. ............. | 370/218 |
| 6,778,495 B1 | 8/2004 | Blair ........................... | 370/230 |
| 6,819,658 B1 | 11/2004 | Agarwal et al. ............ | 370/316 |
| 6,826,196 B1 | 11/2004 | Lawrence ................... | 370/466 |
| 6,862,284 B1 | 3/2005 | Spiegel et al. ........... | 370/395.1 |
| 6,876,657 B1 | 4/2005 | Brewer et al. .............. | 370/394 |
| 6,891,836 B1 | 5/2005 | Chen et al. ............ | 370/395.61 |
| 6,934,249 B1 | 8/2005 | Bertin et al. ................ | 370/218 |
| 6,977,898 B1 | 12/2005 | Miriyala ..................... | 370/236 |
| 7,039,014 B1 | 5/2006 | Krishnamurthy et al. ... | 370/244 |
| 2002/0018269 A1 * | 2/2002 | Chaudhuri et al. ......... | 359/165 |
| 2002/0057649 A1 | 5/2002 | Kinnunen ................... | 370/230 |
| 2005/0207371 A1 | 9/2005 | Chen et al. ................. | 370/721 |

OTHER PUBLICATIONS

"Enhanced Frame Solutions Multilink Frame," White Paper, Lucent Technologies, Inc. (Jul. 2001).

"End-to-End Multilink Frame Replay Implementation Agreement," FRF. 15, Frame Relay Forum Technical Committee (Aug. 1999).

"Multilink Frame Replay UNI/NNI Implementation Agreement," FRF. 16, Frame Relay Forum Technical Committee (Aug. 1999).

"Radcom Network Simulators and Analyzers," http://www.radcom.com/Products.aspx?boneld=660&pageCTemplate=0&print=2, 1 page (based on product prior to Dec. 18, 2001).

"Radcom Protocol Simulators/PNNI Simulator," http://www.radcom.com/Products.aspx?boneld=936&PageCTemplate=0&print=2, 2 pgs. (based on product prior to Dec. 18, 2001).

"Soft-ATM Private Network-to-Network Interface (PNNI)," http://www.ikon-gmbh.de/german/datasheets/netplane/pnni.htm (Jul. 12, 2001).

"PNNI: A little background," http://www.antc.utwente.nl/Reports/ATM/PNNI/pnni_background.html (Sep. 19, 2001).

"Protocol Directory - ATM Signaling & Routing," http://www.protocols.com/pbook/atmsig.htm (Nov. 14, 2001).

International Telecommunication Union (ITU), ITU-T, Q.2931. B-ISDN Application Protocols for Access Signaling (Feb. 1995).

The ATM Forum Technical Committee, "Addressing Addendum to ATM User-Network Interface (UNI) Signalling Specification, Version 4.0," ATM Forum document No. AF-CS-0107.000, Feb. 1999.

The ATM Forum Technical Committee, "UNI Signalling 4.0 Security Addendum," ATM Forum document No. AF-CS-0117.000, May 1999.

The ATM Forum Technical Committee, "Modification of Traffic Parameters for an Active Connection Signaling Specification (PNNI, AINI, and UNI), Version 2.0," ATM Forum document No. AF-CS-0148.001, May 2001.

The ATM Forum Technical Committee, "ATM User-Network Interface (UNI) Signalling Specification, Version 4.0," ATM Forum document No. af-sig-0061.000, Jul. 1996.

* cited by examiner

| LINK | 100% ALLOCATION FOR CALL 1 (NO OVERBOOKING) | 10% ALLOCATION FOR CALL 1 | 50% ALLOCATION FOR CALL 2 |
|---|---|---|---|
| LINK A 100MBPS CAPACITY | 10/90 | 1/99 | 5/94 |
| LINK B 200MBPS CAPACITY | 10/190 | 1/199 | 5/194 |
| LINK C 50MBPS CAPACITY | 10/40 | 1/49 | 5/44 |

ATM signaling protocol stack

CONNECTION-BASED BANDWIDTH UTILIZATION

FIELD OF THE INVENTION

The present invention relates generally to a digital communications network. More particularly, the present invention relates to a way of providing connection-based bandwidth utilization.

BACKGROUND OF THE INVENTION

A digital network comprises of a group of switches that are connected to each other through a variety or interfaces. Asynchronous Transfer Mode ("ATM") or "cell switching" is a technology designed for transmitting digital information such as voice, video, and data at high speeds through the digital network. The digital information is transferred by first being broken into equal sized units called cells. The cells are then transmitted from node to node until they reach a destination node through a pathway (or connection) in the digital network.

The digital network is constructed of digital switches coupled together by digital communication links such as trunks. These trunks carry the cells of information between the digital switches along the connection. The digital switches route the cells from incoming communication links to outgoing communication links and finally to the destination node.

The trunks in the digital network vary in size with each trunk size capable of handling a certain amount of bandwidth. The trunk's bandwidth handling capability determines the amount of traffic that can be channeled through the trunk at any one time. In a communication, such as a call, between the destination node and an initial node each trunk being utilized for channeling the communication is requested to set aside an amount of bandwidth requested by the client setting up the communication for completion of a call. In many instances the client requesting the allocation of bandwidth per call does not use all of the requested bandwidth at any one time. This wastes valuable trunk space by having the trunk tied up with a requested bandwidth allocation that is being underutilized.

One prior art solution attempts to overcome the wasting of trunk resources. The solution involves manually programming each trunk to allocate an amount of bandwidth lower than the bandwidth requested by the client. This is known as static overbooking. With static overbooking, a Private Network-to-Network Interface ("PNNI") controller is configured to provide overbooking per interface and service category. Because the client does not use all of the requested bandwidth, allocating an amount less than the requested amount leaves the unused portion available for use for other calls. A related prior technique is static underbooking, which involves programming each trunk to allocate an amount of bandwidth higher than the bandwidth requested by the client.

Nevertheless, the fact that ATM networks typically include numerous nodes and trunks places a limitation on the prior art static overbooking and underbooking approaches. Because there are numerous nodes available, numerous paths may be constructed using these nodes. Because path construction depends upon the availability of network resources at the time a call is placed, it is difficult to determine which path and therefore which nodes and trunks may be used for any particular call. Not knowing in advance which path a call may take makes it difficult to program every trunk in the network.

Yet another problem with prior art static overbooking or underbooking is that each manual programming task would have to be repeated for a subsequent call. Because client requests for bandwidth allocation change over time and may change for each call placed by the client, the manual configuration would have to be performed every time a change is made. This approach is inefficient, costly, and can results in delays.

Yet another problem with manual configuration is that it does not allow for system monitoring. Typically network resources and client requests and usage of resources change frequently and would need to be monitored and updated for maximizing trunk capacity. Manual configuration without any monitoring does not provide the gathering of data for updating trunk bandwidth allocations and therefore is an inefficient approach.

SUMMARY OF THE INVENTION

A method to provide connection-based bandwidth utilization is disclosed. The method includes providing a connection between a plurality of clients in the network environment. The connection is between the plurality of clients by a plurality of nodes through a plurality of trunks. The utilization capacity of the plurality of trunks is automatically adjusted using standards-based signaling.

Other features and advantages of the present invention will be apparent from the accompanying drawings and from the detailed description, which follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

A way of providing connection-based bandwidth utilization is disclosed. The utilization capacity of a plurality of trunks is automatically adjusted using standards-based signaling.

The adjusting is performed by signaling a percentage utilization factor using Private Network—Network Interface ("PNNI") signaling and automatically configuring each node and trunk along a call path based on the percentage utilization factor. Signaling the percentage utilization factor along with the call allows automatic allocation of the bandwidth resources of a trunk for the call. In addition, because the bandwidth allocation is on a per connection basis, as the percent utilization factor is signaled with each call, any subsequent call with different parameters (or a request for a change in bandwidth allocation) can be accommodated automatically, helping to improve the usage of trunk capacity.

Another advantage of using PNNI signaling is that it allows each node to either recognize the percentage utilization factor signaled along with the call or simply pass the call to the next node that recognizes the format of the percentage utilization factor in the PNNI signaling message.

In addition, the Information Element ("IE") in PNNI signaling permits several options. A node may choose to override a preexisting bandwidth allocation and assign a new bandwidth allocation based on the percent utilization factor, apply the percentageage utilization factor in addition to the preexisting bandwidth allocation, or simply ignore the percentage utilization factor and use the preexisting bandwidth allocation. These decisions depend on a number of factors, such as network resources and client requests.

Figure 1:
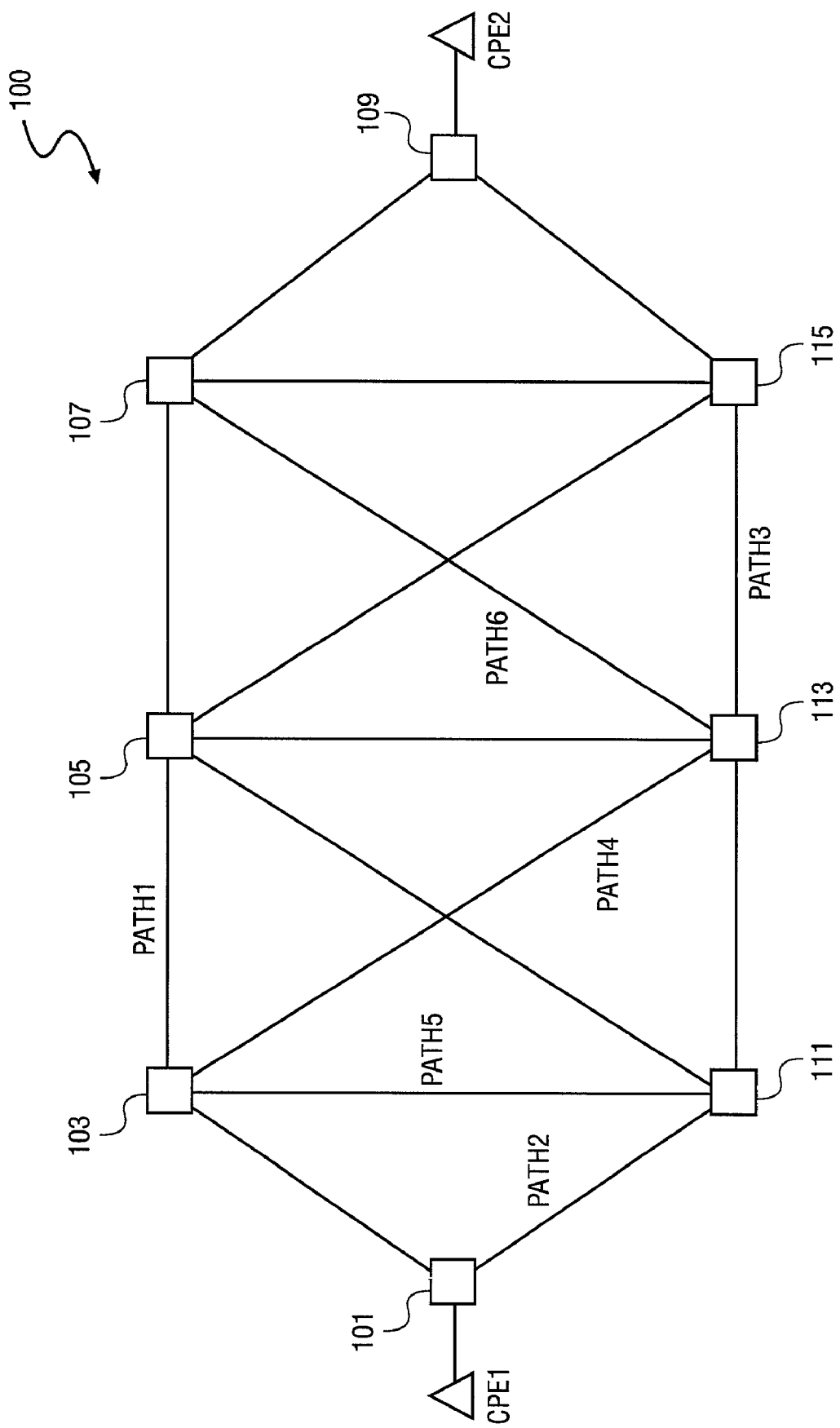
FIG. 1 is an exemplary diagram of a digital network environment that includes a plurality of trunks and in which embodiments of the present invention can be implemented.

FIG. 1 illustrates an exemplary diagram of a digital communications network environment that includes a plurality of trunks and in which embodiments of the present invention can be implemented. Referring to FIG. 1, the digital network environment 100 includes a plurality of nodes such as switches 101, 103, 105, 107, 109, 111, 113, and 115 that are interconnected through a plurality of trunks. The trunks support the digital network 100 by transferring data from a starting node CPE1 to an ending node CPE2.

The digital network environment 100 may include a variety of networks, such as an asynchronous transfer mode ("ATM") network, a virtual private network ("VPN"), or a combination of virtual private networks and non-virtual private networks. The network 100 includes a plurality of clients coupled with each other through network 100. Client 1 (CPE1) and client 2 (CPE2) can each be a workstation, computer, server, or other similar device, for example.

The plurality of nodes 101, 103, 106, 107, 109, 111, 113, and 115 are interconnected through a plurality of paths, such as Path 1 through Path 6. A path is a connection between nodes, clients, or end users. A path can include a plurality of paths for connecting any number of nodes within the digital network for transferring data from CPE1 to CPE2. For one embodiment, the path is chosen to be the best route available between clients, such as CPE1 and CPE2, for making a connection at the time a communication request is placed.

Each node in a path is linked to all its neighboring nodes and to all other nodes in the network through the neighboring nodes. A node has a capability of receiving data, processing data, and passing data along to another node. A decision is made at each node to route received data to another node. For example, node 105 may receive data from node 103 and pass the data along to any selected neighborhood node, such as node 111, 113, 115, or 107. The forwarding decision is made at each node, such as node 105, based on several factors, including the availability of network resources.

Each node in the path of the cell is an ATM switch coupled to a trunk. The trunks coupled to each ATM switch in the cell path may either be of the same size or a different size. For example, node 103 may be an ATM switch coupled to an OC12 trunk and the node 105 may be an ATM switch coupled to an OC48 trunk.

A plurality of links or trunks may exist between any two nodes in the digital network 100. The plurality of links aid in exchange of data between any two nodes by allowing transportation of cells on the links. The links may be of any form, such as a cable wire, fiber optic line, an RF connection, or a satellite connection. The plurality of links between any two nodes allow multiple communication between the two nodes at any one time.

One type of communication between CPE1 and CPE 2 is a call that uses standards-based signaling, such as Private Network-to-Network Interface ("PNNI") and User-Network Interface ("UNI") signaling. The call communication between CPE1 and CPE2 may include data, audio, or video information.

The communication is operational after a connection is established between the two end points CPE1 and CPE2. For exemplary purposes, assume a call request is placed by CPE2 to CPE1 requesting an allocation of 10 megabits per second ("MBPS") of bandwidth and Path 1 is chosen for connecting the call. Statistically it may be the case that the client CPE2 does not use all of its allocated bandwidth and only uses 70% of its bandwidth. The 70% figure may be based on statistics based on the historical monitoring of a client's trunk usage for each call placed. Because only 70% bandwidth would actually be used, allocating 10 MBPS on any truck ties up resources of the trunk and lets the trunk sit idle without being used to its maximum capacity. Thus, in order to maximize the trunk's utilization for client CPE2 that statistically uses 70% of the requested bandwidth, only 70% bandwidth may be allocated. Thus a call request for 10 MBPS may be provided with a 7 MBPS allocation.

The allocation may differ for each trunk in the connection path. For example, an OC12 trunk that has a smaller bandwidth capacity than a OC48 trunk may have a different bandwidth percentage allocated to it than an OC48 trunk. Because the resources of a smaller trunk are more valuable due to the smaller capacity, a lower bandwidth percentage such as 50% or 60% may be allocated to an OC12 truck, wherein 70% may be allocated to an OC48 trunk.

As another example, assume that statistically 50% of bandwidth requested is used. Thus, an OC48 trunk, which has 2.4 Gigabits Per Second ("GPBS") of capacity, can be overbooked by 50% to 4.8 Gigabits Per Second ("GPBS"). This allocation would allow several other users access to the trunk at the same time and not tie up resources. If the client uses more than its statistical 50% of bandwidth, then the trunk may either accommodate the extra bandwidth (depending upon total usage of the trunk from other users) or drop some part of the information if extra bandwidth is not available due to high usage of the trunk. Traditional monitoring systems may be used for statistical monitoring of a trunk. Bandwith allocation for the trunk, such as an OC48 trunk, may be changed based on the monitoring results.

The allocation also depends upon the quality of service requested by the client. In some instances, a client may pay more for having network resources available even though the client may not make full use of the allocated bandwidth. In such instances, a higher bandwidth percentage may be allocated. Bandwidth allocation percentages may be changed or updated frequently based on statistics derived by monitoring of a client's trunk usage for each call placed. The allocation changes may be accomplished by automatically signaling the required percentage utilization along with each call, and increasing or decreasing the bandwidth allocation based on the value of the percentage utilization factor. The automatic signaling is a standards-based signaling, such as PNNI protocol signaling. This approach allocates bandwidth for each trunk without having to manually configure each trunk every time.

Figures 2A, 2B:
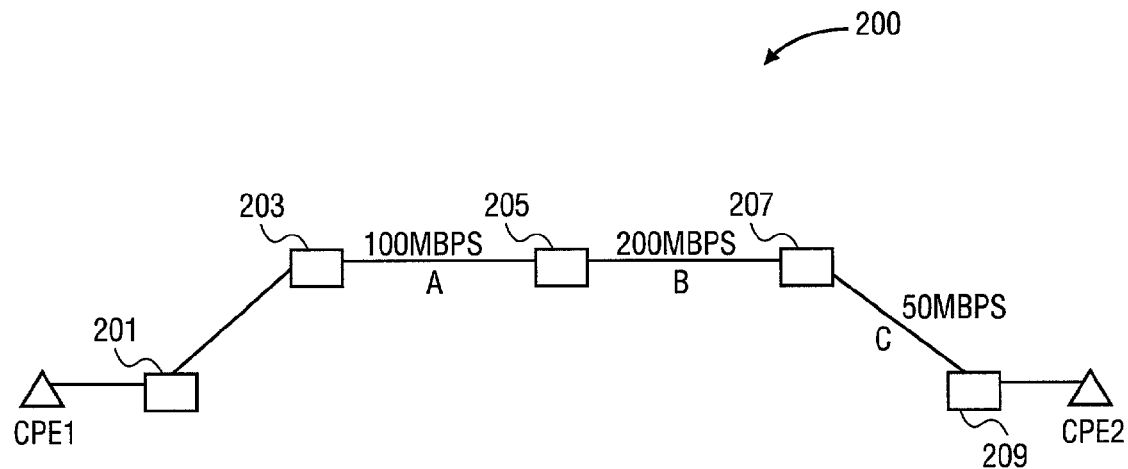
FIG. 2A illustrates an exemplary path taken by separate calls placed between two clients in a digital network according to one embodiment.
FIG. 2B is a chart showing the bandwidth utilization per trunk for separate calls based on separate overbooking options according to one embodiment.

FIG. 2A illustrates one exemplary path that may be taken by multiple calls that are placed through the network according to one embodiment. The calls are placed in a network 200 between CPE1 and CPE2 using a path that includes nodes 201, 203, 205, 207, and 209. Alternatively other paths and nodes may be used as discussed earlier in connection with FIG. 1.

Network nodes 203 and 205 are coupled via link A, nodes 205 and 207 are coupled via link B, and nodes 207 and 209 are coupled via link C. A plurality of links may couple any two nodes, but for purpose of illustration one link between each node is shown.

For purposes of illustration, assume that link A has a capacity of 100 Megabits per second, link 1 B has a capacity of 200 MBPS, and link C has a capacity of 50 MBPS. Assume that a call request for a 10 MBPS call is placed by client CPE1 and that a connection is established between the two end points CPE1 and CPE2.

FIG. 2B shows bandwidth allocations for links A, B, and C for three separate scenarios—namely, no overbooking, a first call involving overbooking with a 10% allocation, and a second call involving overbooking with a 50% allocation.

For the no overbooking situation, FIG. 2B shows that (1) for link A 10 MBPS of the total 100 MBPS bandwidth is allocated for the call, (2) for link B, 10 MBPS of the total 200 MBPS bandwidth is allocated and (3) for link C, 10 MBPS of the 50 MBPS bandwidth is allocated. For link A, 90 MBPS is not allocated, for link B 190 MBPS is not allocated, and for link C 40 MBPS is not allocated.

FIG. 2B also shows the result of a 10% allocation overbooking approach for a first call between CPE1 and CPE2 with respect to links A, B, and C. For the 10% allocation overbooking approach, a 10% allocation of a 10 MBPS call is either requested by the user or chosen through the use of a statistical analysis of usage. Because 10% of a 10 MBPS call is 1 MBPS, a message is sent (along with the call connection) from node 203 to node 205 (on Link A) allocating 1 MBPS of bandwidth. Link A may only carry a maximum of 100 MBPS at a time. Allocation of 10% bandwidth—i.e., 1 MBPS for a 10 MBPS call—leaves open 99 MBPS of the 100 MBPS on Link A.

Similarly, when the call reaches node 205 on its path, node 205 is configured for a 10% allocation by the signaling message sent along with the call. The allocation results in 1 MBPS allocated from node 205 to node 207 on Link B. Because node 207 has a bandwidth capacity of 200 MBPS, a 10% utilization leaves open 199 MBPS of bandwidth space that may be carried by Link B.

Similarly, when the call reaches node 207 on its path, node 207 is configured for a 10% allocation by the signaling message sent along with the call. The allocation results in 1 MBPS being allocated from node 207 to node 209 on Link C. Because link C has a bandwidth capacity of 50 MBPS, a 10% utilization leaves open 49 MBPS of bandwidth space on Link C.

A comparison of the "no overbooking" approach for a call and the "10% allocation overbooking" approach for the call shows the advantage of overbooking. By using overbooking, more bandwidth is available on each link for other users. For example, with a 10% allocation (i.e, percentage utilization) on link A, 99 MBPS is available instead of 90 MBPS. On link B, 199 MBPS is available instead of 190 MBPS. On link C, 49 MBPS is available instead of 40 MBPS.

Another example is as follows. Assume that for a second 10 MBPS call, either the client CPE1 requests a 50% allocation or that based on information gathered by the first call a statistical determination is made that client CPE1 should get a 50% allocation for the second 10 MBPS call.

FIG. 2B shows the results for links A, B, and C of a 50% allocation overbooking for a second 10 MBPS call. Because 50% of a 10 MBPS call is 5 MBPS, a message (and call connection) is sent from node 203 to node 205 on link A allocating 5 MBPS of bandwidth. Because link A has a capacity of 100 MBPS, and call 1 allocated 10% for a 10 MBPS call, (i.e., 1 MBPS of bandwidth), an additional 5 MBPS may be allocated for call 2. This results in the available bandwidth being 94 MBPS for link A given that a total of 6 MBPS of bandwidth was allocated for calls 1 and 2.

Link B has a bandwidth capacity of 200 MBPS. When call 2 reaches node 205 on its path, link B is configured for a 50% allocation overbooking by the signaling message sent along with the call. The 50% allocation results in 5 MBPS of the bandwidth of link B being used for the 10 MBPS call. Call 1 allocated 1 MBPS of bandwidth and call 2 allocated an additional 5 MBPS of bandwidth. This leaves link B with 194 MBPS of available bandwidth.

Similarly, when the call 2 reaches node 207 on its path, link C is configured for a 50% allocation overbooking by the signaling message sent along with the call. The allocation results in 5 MBPS of the bandwidth of link B being used for the 10 MBPS call. Link C has a bandwidth capacity of 50 MBPS. Call 1 allocated 10% of the 10 MBPS call (i.e., 1 MBPS of bandwidth), and an additional 5 MBPS is allocated for call 2, leaving open 44 MBPS of the 100 MBPS bandwidth for link C.

Alternatively, higher or lower percentage allocations (also referred to as percentage utilizations) could be used for links A, B, and C.

The overbooking concept discussed above is called dynamic overbooking because the overbooking is done on a per call or per connection basis. Various combinations of dynamic overbooking and prior art static overbooking can be used. The original bandwidth allocation of a trunk can be maintained, the original bandwidth allocation can be overridden with a new percentage allocation, and a percentage allocation can be applied in addition to the original allocated bandwidth percentage. For example, dynamic and static overbooking may be used on link C of FIG. 2A, which connects node 207 with node 209. Assume the static overbooking to be 10%, the dynamic overbooking to be 10%, and the capacity of link C to be 50 MBPS. For a 10 MBPS call, if a 10% static overbooking is applied and then a 10% dynamic overbooking is applied, the result is a total allocation of 0.1 MBPS. This would leave open 49.9 MBPS of bandwidth that may be used by link C and allocated to other clients or calls.

Figure 3:
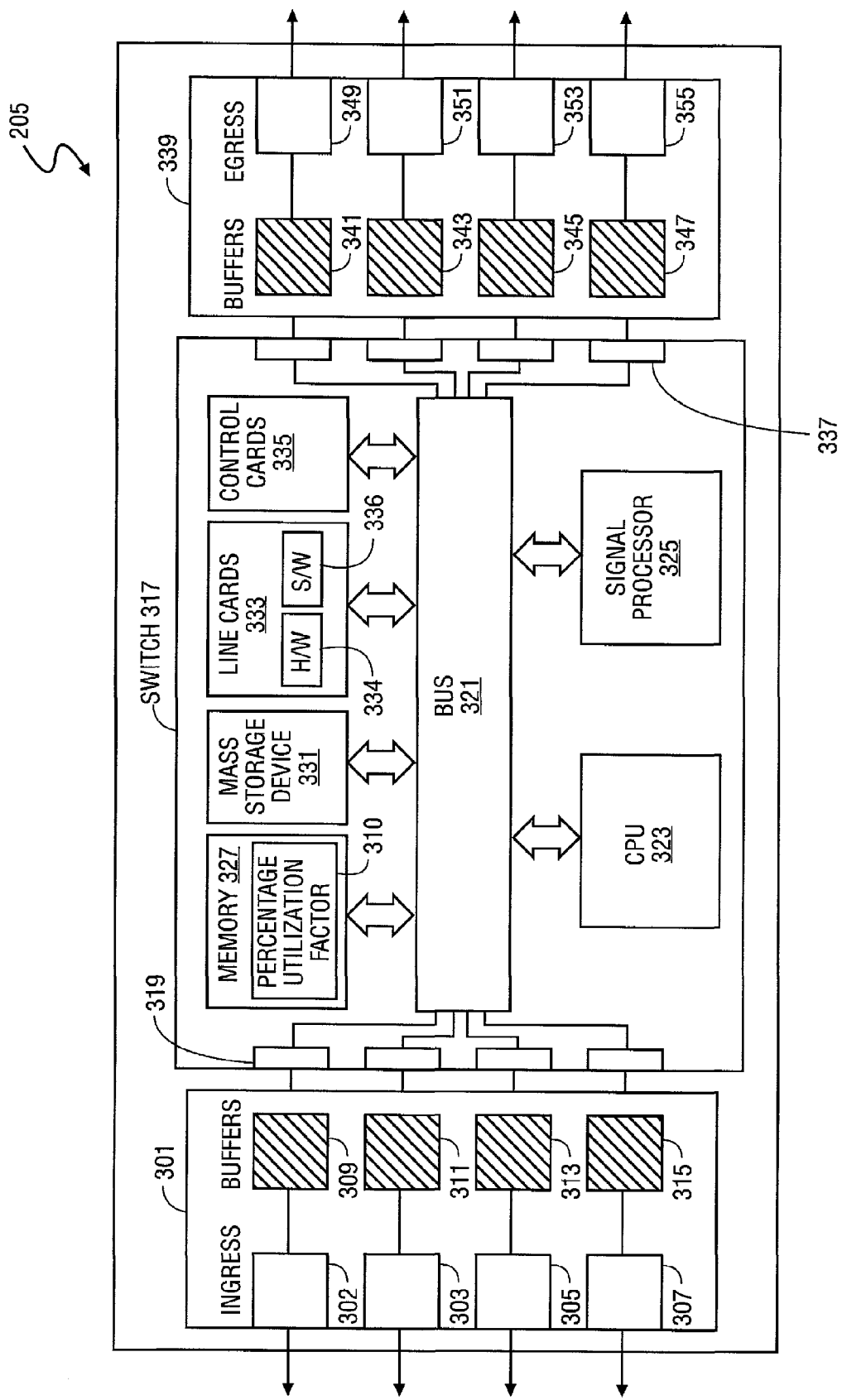
FIG. 3 illustrates a network node capable of receiving, processing, and outputting data according to one embodiment.

FIG. 3 illustrates a network node 205 capable of receiving, processing, and outputting data. Network node 205 is similar to the other network nodes, such as nodes 201, 203, 207, and 209.

Network node 205 includes an ingress unit 301, a switch 317, and an egress unit 339. Ingress unit 301 may be coupled to input data links for receiving data from another network node via a trunk coupled to the node. Ingress unit 301 may includes ingress input areas 302–307, and buffering units 309–315 coupled to the ingress areas 302–307 for buffering the received data from the input links. Ingress unit 301 may be coupled to switch 317 for transferring the buffered data to the switch 317.

Switch 317 is an ATM switch. Alternatively, other types of switches may also be used. ATM switch 317 is coupled to a variety of trunks—for example, OC48, OC12, or DS3 trunks.

Switch 317 includes a digital processing system for processing data received by and to be sent by the network node. The digital processing system includes a bus 321 coupled to a plurality of input and output ports 319 and 337, a signal processor 325, a central processing unit ("CPU") 323, a memory 327, a mass storage device 331, a plurality of line cards 333, and a plurality of control cards 335.

For one embodiment, bus 321 is a standard system bus. CPU 323 and signal processor 325 can be used to process information and/or signals for switch 317. Signal processor 325 can be used to process speech or audio information and signals for speech processing and recognition.

Memory 327 can comprise dynamic random access memory ("DRAM") static random access memory ("SRAM"), read-only memory ("ROM"), or other storage devices, for storing data or program codes used by CPU 323 or signal processor 325. For example, memory 327 may store percentage utilization factor information 310 to be processed by signal processor 325 or CPU 323. Memory 327 may also store temporary variables or other intermediate information during execution of instructions by CPU 323 or signal processor 325. Mass storage device 331 can be a hard disk drive a floppy disk drive, an optical disk drive, or other mass storage device for storing information or instructions for the switch 317.

Switch 317 may contain four or more line cards 333 and several control cards 335 that control the line cards via bus 321. For one embodiment, the line cards 333 are coupled to four ports 319 and four ports 337 via bus 321. Alternatively, lines card 333 may be coupled to eight, sixteen, or more ports. Each port may support a specific data bit rate. User traffic may be received through one line card and transmitted through another. This cross-connection is determined by a control card 335 upon the establishment of a connection. Typically, each line card also contains a hardware module 334 to accomplish bit-level and cell-level functions (such as recombining, quality of service, etc.) and a software module 336 for reprogramming hardware upon changing connections. The control cards 335 may typically run the various protocols, such as the PNNI protocol, and may contain datagrams for encapsulating resource configuration information within a user definable programmable data unit ("PDU") of a signaling protocol (e.g., the Service Specific Connection Oriented Protocol ("SSCOP")). Alternatively, such software may be implemented elsewhere within the switch 317 or external to the switch 317. Bus 321, CPU 323, signal processor 325, memory 327, mass storage device 331, line cards 333, and control cards 335 communicate to process PNNI packets received from input ports 319.

An egress unit 339 is coupled to switch 317. Egress unit 339 includes a series of buffers 341, 343, 345, and 347 coupled to a series of egress areas 349, 351, 353, and 355. The series of buffers 341, 343, 345, and 347 and egress areas 349, 351, 353, and 355 are selected by the switch 317 based on class of service. The egress unit 339 is coupled to output data links and data is communicated from these output data links to a node designated by the switch 317.

At the switch 317, data is received from the ingress unit 301 and a decision is made to route the data to a particular node. Further functions such as quality of service ("QOS") may be determined by switch 317. Each trunk coupled to the ATM switch 317 has a bandwidth capacity allocated to it. For example, a trunk, such as an OC48 trunk, has a relatively large bandwith and an OC12 trunk has a comparatively smaller bandwidth.

Switch 317 is coupled to a trunk and has a control plane and a data plane. The data plane can accommodate a fixed capacity of bandwidth that a trunk may carry. Thus, the amount of data that can be accommodated in a data plane of ATM switch 317 depends upon the size of the trunk coupled to the ATM switch. The control plane manages the data provided to the data plane. The control plane may ask for data exceeding the capacity of the data plane based on a statistical analysis showing that data plane is not being fully utilized.

Statistical multiplexing may be used to accommodate more data in the trunk. For example, if a trunk capacity is 2.4 GPBS, then the highest level of actual capacity a data plane can accommodate is 2.4 GPBS. Thus, the control plane has the capacity to allocate 2.4 GPBS to its customers, allowing customers to send 2.4 GPBS of data through the trunk. Clients, however, do not always send data at maximum trunk capacity at any one time. Therefore, trunk space is often underutilized. Overbooking helps to maximize trunk usage.

Overbooking involves booking the data plane beyond its capacity. For example, by overbooking a trunk which can handle 2.4 GPBS, you are allowing the control plane to communicate to its clients or customers that more than 2.4 GPBS may be sent at any one time. This allows clients that are networked with the trunk to send data without having the 2.4 GPBS limitation. Because many clients do not send all the data at the same time, this approach helps to maximize utilization of the trunk.

For example, without overbooking, perhaps 1.2 or 1.3 GBPS of bandwidth might be used at a given time. With overbooking, bandwidth close to the maximum capacity of 2.4 GBPS at any given time might be used. If data is sent beyond the 2.4 GBPS maximum capacity of the trunk, however, then the data is dropped. Nevertheless, data exceeding the maximum bandwidth is relatively rare.

Figure 4:
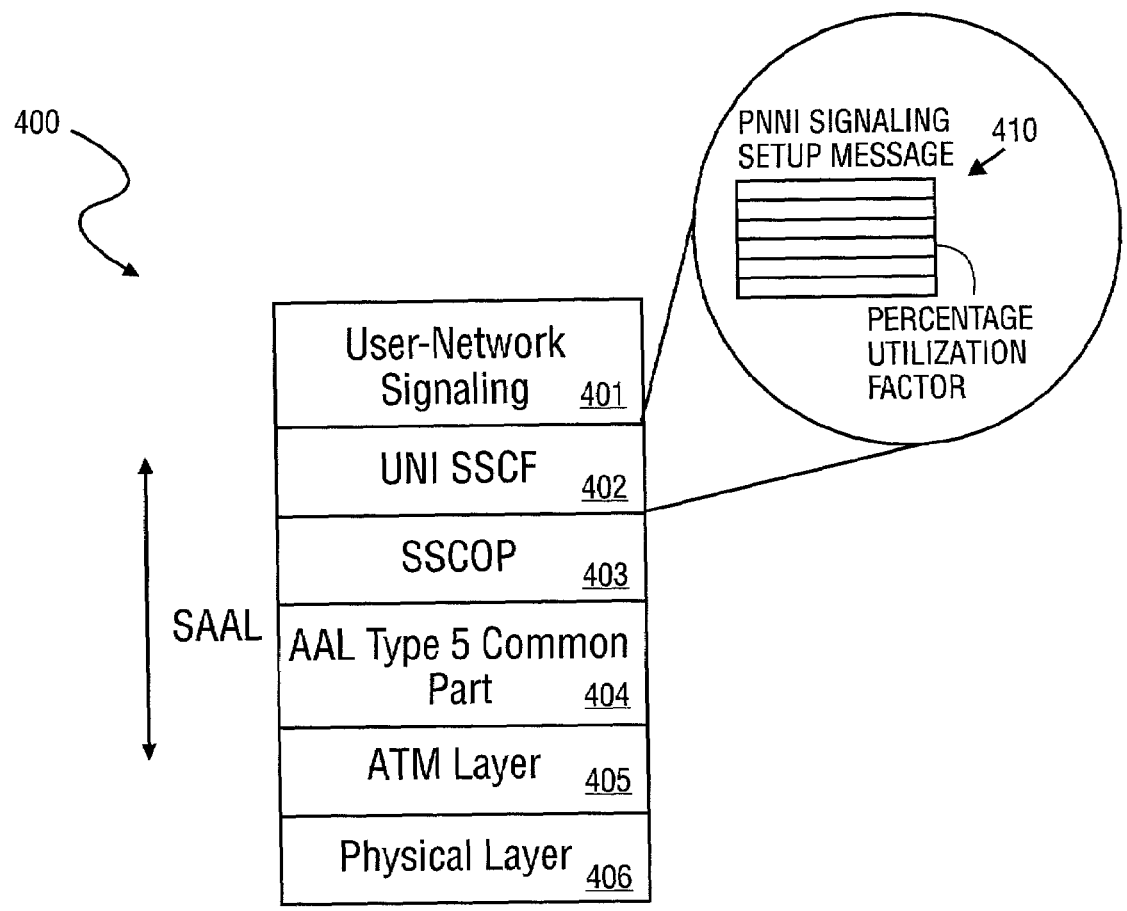
FIG. 4 illustrates an exemplary diagram of an asynchronous transfer mode ("ATM") signaling protocol stack in which embodiments of the present invention can be implemented.

FIG. 4 is a diagram of an ATM signaling protocol stack 400 in which embodiments of the present invention can be implemented. The ATM signaling protocol stack 400 is used for signaling information between nodes and users of an ATM network, such as network 100 of FIG. 1. Types of information exchanged in an ATM network may include requests for use of network resources, signaling messages, bandwidth allocation factors, and circuit parameters for establishing a virtual circuit path between two users. Other types of signaling can be accomplished using the ATM signaling protocol stack 400. A successful signaling exchange performed using the ATM signaling protocol stack 400 results in creation of a Virtual Path Identifier (VPI)/Virtual Channel Identifier (VCI) pair and allocation of requested bandwidth.

The ATM signaling protocol stack 400 includes several protocols for connection control signaling, such as User-Network Signaling 401, User Network Interface Service Specific Coordination Function ("UNI SSCF") 402, Service Specific Connection-Oriented Protocol ("SSCOP"), ATM Adaptation Layer ("AAL") Type 5 Common Part 404, ATM Layer 405, and a Physical Layer 406. These protocols are sent over a Signaling ATM Adaptation Layer ("SAAL") to ensure reliable delivery. The SAAL is divided into two parts—namely, a Service Specific Part and a Common Part.

The ATM layer 405 in the ATM signaling protocol stack 400 is used for establishing virtual connections between ATM nodes present in the network 100. The ATM layer uses information contained in each ATM node for configuring the virtual connection. The configuration allows an ATM node to perform functions such as multiplexing and demultiplexing of ATM cells, translating VPI/VCI values, and header modifications. The physical layer 406 in the ATM network has several functions, including frame generation, cell delineation, and bit-level transmission.

The Service Specific Part of the SAAL of the ATM signaling protocol stack 400 includes UNI SSCF 402 and SSCOP 403. The UNI SSCF 402 includes PNNI signaling information. The UNI/PNNI signaling protocols interface with users of the SSCF protocol and SSCOP for reliable delivery of cells to users of digital network 100. The UNI/PNNI protocols perform network signaling functions such as call establishment, call clearing, and negotiation and allocation of bandwidth. UNI/PNNI signaling may also be used to perform network signaling functions.

For one embodiment of the invention, the PNNI signaling protocol includes a SETUP message 410 that includes a percentage utilization factor. This allows each ATM network node to be automatically configured rather than manually configured node by node.

PNNI is a hierarchical dynamic link state routing protocol. PNNI signaling may be used in a large scale ATM network having multiple hierarchical groups or in single peer groups with a local network. PNNI signaling protocol comprises procedures to dynamically establish, maintain, and clear ATM connections at a private network-to-network interface or a network node interface between two ATM networks or two ATM network nodes. The PNNI signaling protocol is based on the ATM Forum UNI specification and on the International Telecommunications Union ("ITU") Q.2931 specification, but there are some differences between PNNI and the UNI specification and Q.2931.

Figure 5:
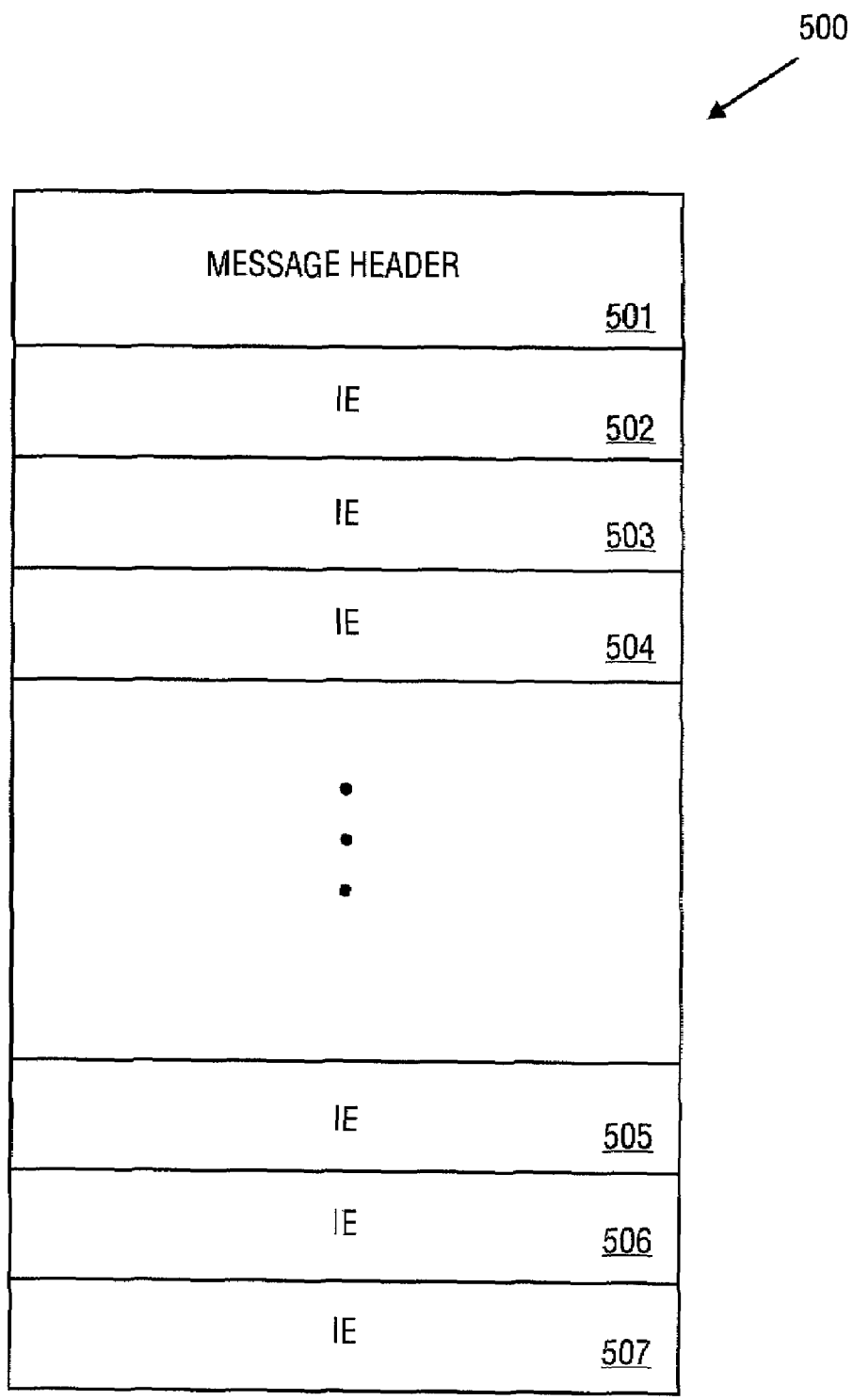
FIG. 5 shows the format of a PNNI signaling message.

FIG. 5 illustrates the structure of a PNNI signaling message 500. The PNNI signaling message 500 is comprised of a message header 501 and a variable number of Information Elements ("IEs") 502 through 507. Although six IEs are shown in FIG. 5, more or fewer IEs could also be part of the PNNI signaling message 500.

The message header 501 contains information regarding the PNNI signaling message, such as a protocol discriminator, a call reference value, a message type, and a message length. For one embodiment, the message header 501 is 8 bits wide and contains a plurality of octets.

The PNNI signaling message types include call establishment messages, call clearing messages, miscellaneous messages, and point-to-multipoint messages. In particular, PNNI signaling message types include ALERTING, CALL PROCEEDING, CONNECT, SETUP, RELEASE, RELEASE COMPLETE, NOTIFY, STATUS, STATUS ENQUIRY, RESTART, RESTART ACKNOWLEDGE, STATUS, ADD PARTY, ADD PARTY ACKNOWLEDGE, PARTY ALERTING, ADD PARTY REJECT, DROP PARTY, and DROP PARTY ACKNOWLEDGE.

"SETUP" is one of call establishment message types for PNNI signaling messages. The SETUP PNNI signaling message is sent by the calling user to the network and by the network to the calling user to initiate a call. The SETUP message type is included in message header 501 for a SETUP PNNI signaling message.

The PNNI signaling message 500 includes information elements 502–507. There are several types of information elements. Some may appear only once in the message. Others may appear more than once. Depending on the message type, some information elements are mandatory and some are optional. The order of the information elements does not matter to the signaling protocol. Information elements include, but are not limited to, call state, connection identifier, quality of service parameter, calling party number, called party number, etc. For one embodiment, each of the information elements 502–507 is 8 bits wide and contains a plurality of octets.

For one embodiment of the invention, a percentage utilization factor is transported between network nodes in a PNNI signaling SETUP message. In particular, for one embodiment, the percentage utilization factor is transported in a Generic Application Transport ("GAT") information element ("IE") that is part of the PNNI signaling SETUP message. For an alternative embodiment, the percentage utilization factor is transported in its own Percentage Utilization Factor information element that is part of a PNNI signaling SETUP message.

Figure 6:
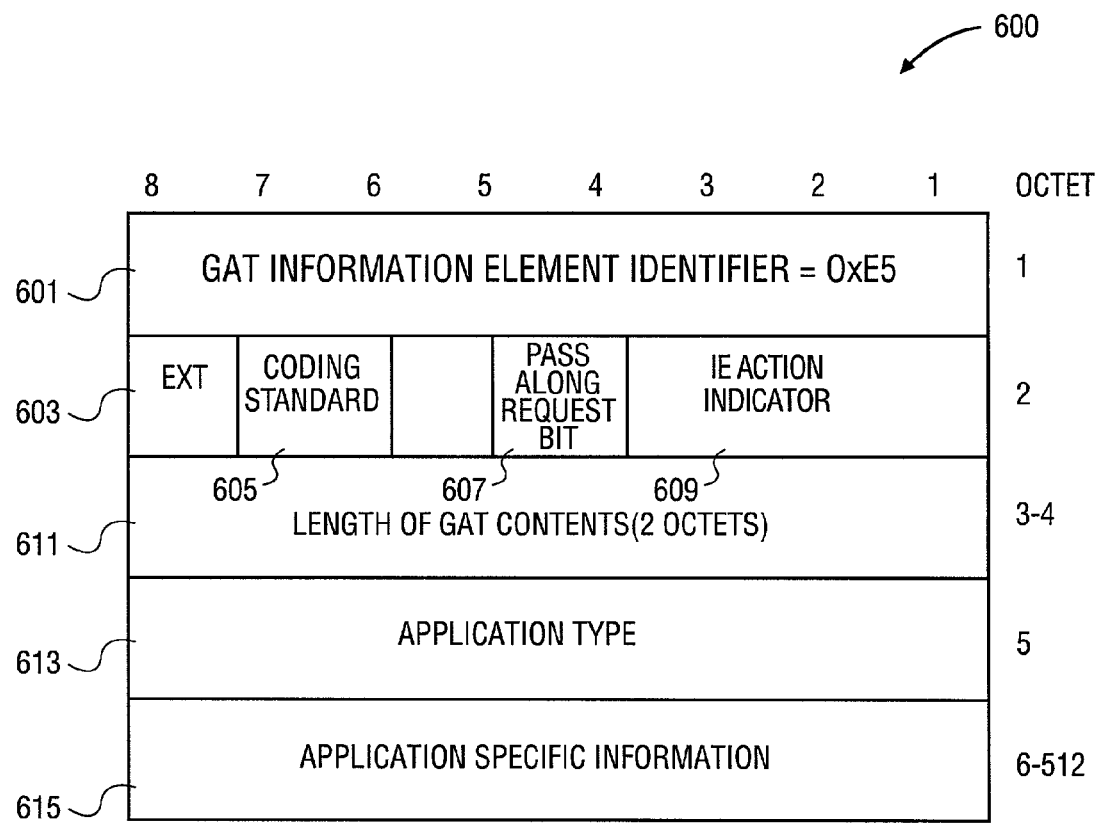
FIG. 6 illustrates a general application transport information element for a PNNI signaling message according to one embodiment.

FIG. 6 relates to the embodiment of the invention wherein the percentage utilization factor is transported in a Generic Application Transport information element 600 that is part of the PNNI signaling message that is a SETUP message. The GAT information element 600 would be one of the information elements 502 through 507 (shown in FIG. 5) used in a PNNI signaling message 500 that is a SETUP message. The PNNI signaling SETUP message would have the SETUP message type specified in message header 501.

The GAT information element 600 is 8 bits wide and has 512 octets. The GAT information element 600 includes a GAT IE identifier 601, an extension field 603, a coding standard 605, a pass along request bit 607, an IE action indicator 609, a length field 611, an application type field 613, and application specific information 615.

The GAT IE identifier 601 allows a node to recognize the information being sent in the packet 600 and is in the first octet field of the GAT IE 600.

Coding standard 605 specifies the type of coding used to format the GAT IE 600. The pass along request bit 607 allows a node to pass along the GAT IE 600 instead of dropping the IE 600 if the node receiving the GAT IE 600 does not recognize the coding standard 605 of GAT IE 600. For example, GAT IE 600 may be coded in an interoperable coding standard 605 such that an ATM network node that does not support or understand the GAT IE 600 will not reject the GAT IE 600, but instead will simply pass the GAT IE 600 along to the next ATM network node in the transmission path.

The IE action indicator 609 suggests the actions that may be taken by a node receiving the GAT IE 600, such as to accept and implement the parameters of the IE 600 or simply forward the IE 600. Extension 603, coding standard 605, pass along request bit 607, and IE action indicator 609 are in the second octet of GAT IE 600.

The GAT IE 600 also includes a field 611 for length of the GAT contents, an application type field 613, and an application specific information field 615. The GAT field 611 occupies the third and fourth octets. The application type field 613 is the fifth octet of IE 600. The application type field 613 can be organization specific and is coded as Ø×Ø1. The application specific information field 615 may include specific information requested or desired by the users of the network and occupies octets 6 through 512.

Figure 7:
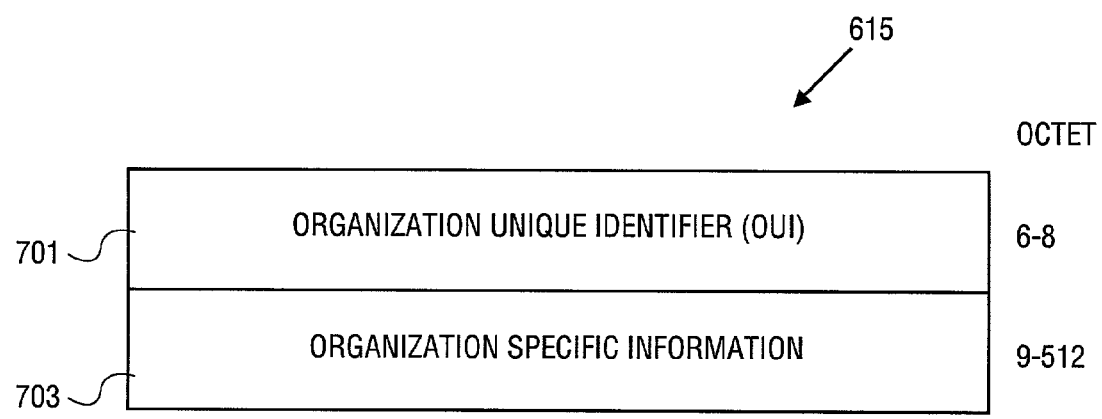
FIG. 7 illustrates application specific information.

When application type field 613 is organization specific, then application specific information field 615 of FIG. 6 will comprise (i.e., will be coded as) organization unique identifier ("OUI") field 701 and organization specific information field 703 shown in FIG. 7. OUI field 701 occupies octets 6 through 8 of GAT IE 600. Organization specific information field 703 occupies octets 9 through 512 of GAT IE 600.

Figure 8:
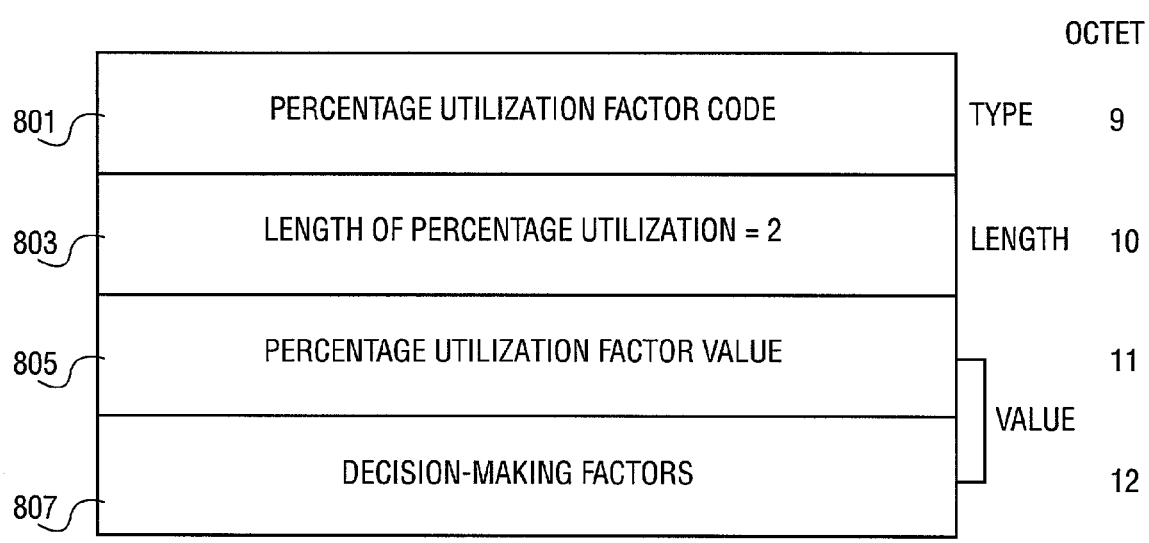
FIG. 8 illustrates organization specific information.

For one embodiment of the invention, octets 9 through 12 of organization specific information field 703 of FIG. 7 comprise respective fields 801, 803, 805, and 807 shown in FIG. 8. Field 801 represents the type of organization specific information, field 803 represents the length of the organization specific information, and fields 805 and 807 represent the value of the organization specific information. The organization specific information of octets 9 through 12 comprises percentage utilization factor code field 801 of octet 9, the length of percentage utilization field 803 of octet 10, the percentage utilization factor value field 805 of octet 11, and a field 807 for decision-making factors.

For one embodiment, the type field 801 carries the code for the percentage utilization factor. The length field 803 includes a value of the length of the percentage utilization factor. For one embodiment, the length of the percent utilization factor is two. Alternatively, other length values may be carried by length field 803.

Field 805 includes the value of the percentage utilization factor. The percentage utilization factor value stored in field 805 is used for configuring each ATM node and trunk for maximizing or changing its bandwidth utilization allocation and capacity.

For one embodiment, the field 807 can be used for carrying decision-making factors that relate to using the percentage utilization factor as an overbooking factor by overriding the already-existing ATM node/trunk utilization configuration or in addition to the already existing ATM node/trunk utilization configuration. Alternatively, field 807 may be used to carry overbooking overriding factors.

Figure 9:
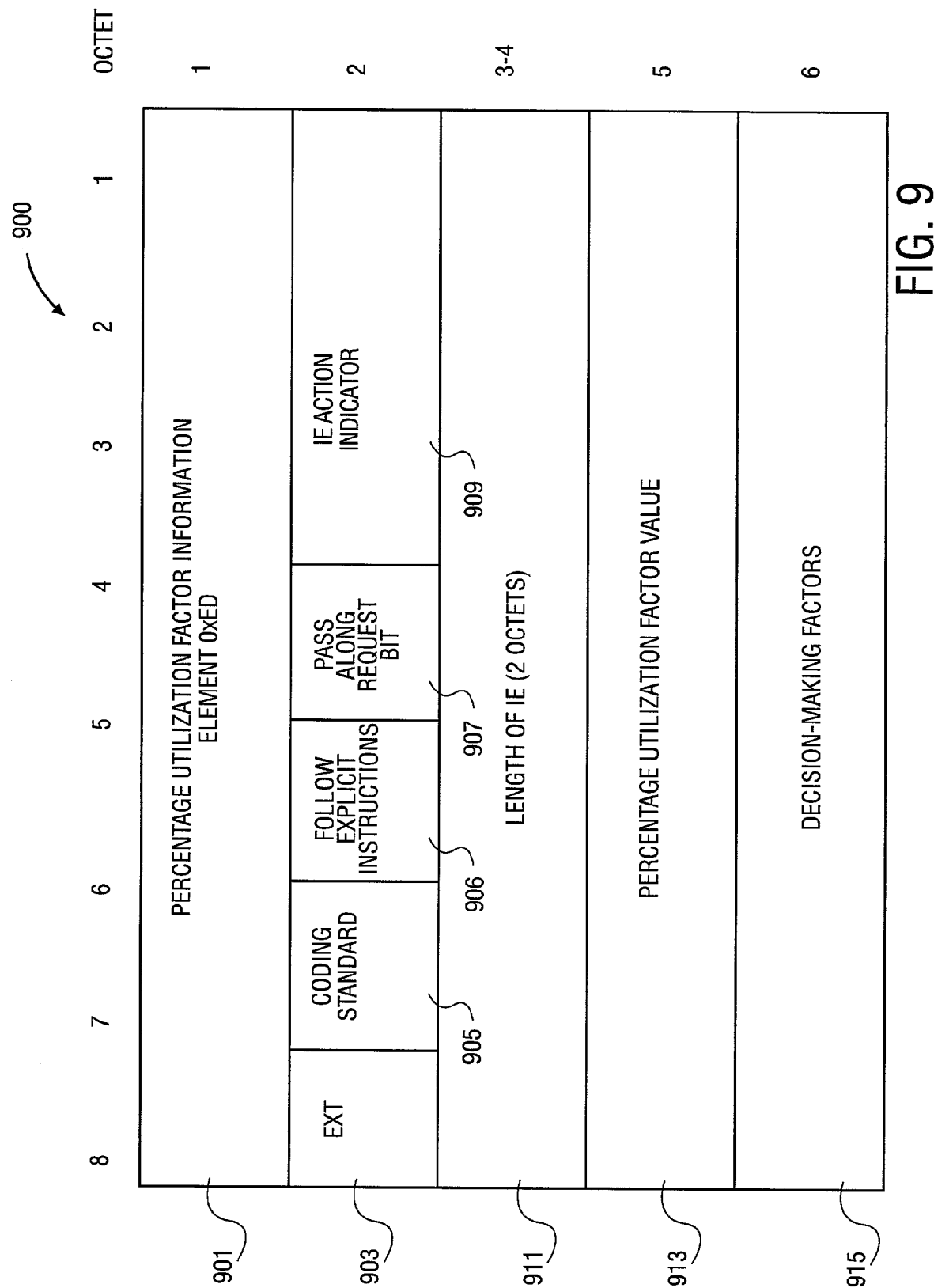
FIG. 9 is illustrates an exemplary diagram of a stand-alone percentage utilization information element according to one embodiment.

FIG. 9 is illustrates a stand-alone percentage utilization information element ("IE") 900 of a PNNI signaling SETUP message according to an alternative embodiment. For that embodiment, IE 900 will be one of the information elements 502–507 of the PNNI signaling message 500 of FIG. 5. By "stand-alone information element," what is meant is that a percentage utilization factor is transported in its own specific Percentage Utilization Factor information element 900 that is part of a PNNI signaling SETUP message rather than being part of GAT information element 600.

The stand-alone percent utilization factor information element 900 is eight bits wide and is comprised of six octets. The first octet is field 901 that indentifies IE 900 as an IE that carries a percentage utilization factor value. For one embodiment, field 901 is coded as Ø×ED.

The second octet of information element 900 contains extension field 903, coding standard field 905, "follow explicit instructions" field 906, pass-along request bit field 907, and IE action indicator field 909. For one embodiment, the coding standard in field 905 is ATM Forum specific. Field 906 can contain a bit indicating that explicit instructions should be followed. Field 907 can contain a bit indicating that the request should be passed along. Field 909 can contain bits (such as ØØ1) that indicate that the switch 205 can discard the information element 900 and proceed with further action.

Octets 3 and 4 of IE 900 include field 911 containing the length of the information element 900. Field 911 thus comprises two octets.

Octet 5 of the information element 900 includes field 913 that contains the percentage utilization factor value. The percentage utilization factor value is used by the switch to determine bandwidth allocation. Octet 6 of the IE 900 contains field 915 that carries decision-making factors that relate to using the percentage utilization factor as an overbooking factor by overriding the already-existing ATM node/trunk utilization configuration or in addition to the already-existing ATM node/trunk utilization configuration. Alternatively, field 915 may carry overbooking overriding factors.

Figure 10:
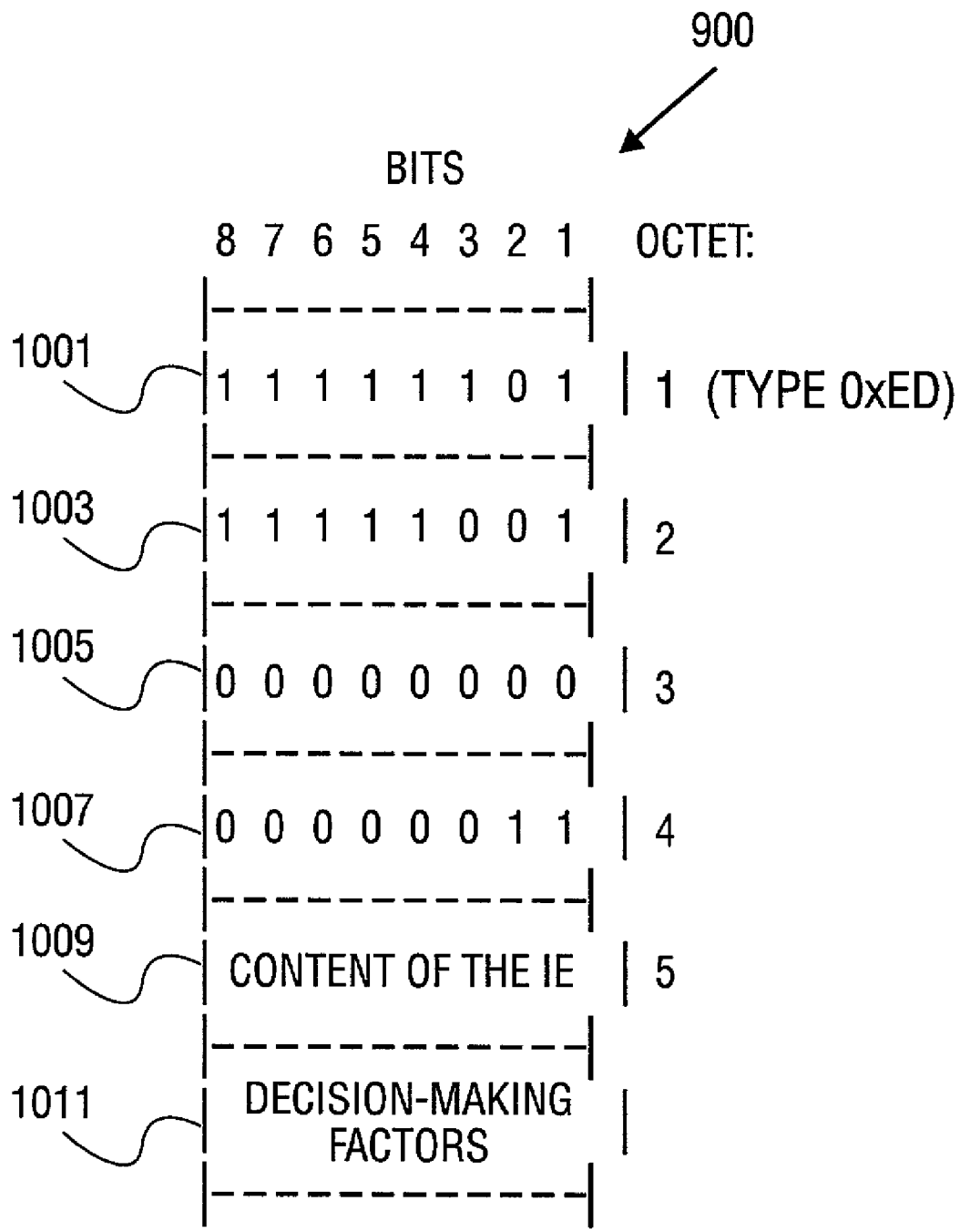
FIG. 10 is an exemplary diagram of a stand-alone information element according to one embodiment.

FIG. 10 illustrates an example of a fully-encoded stand-alone percentage utilization factor information element 900 for one embodiment. Field 1001 is the same as field 901, and is encoded as bit pattern "1 1 1 1 1 1 Ø 1." This bit pattern in field 1001 encodes the fact that information element 900 is a stand-alone information element containing the percentage utilization factor.

Field 1003 in the second octet and contains fields 903, 905, 906, 907, and 909 and thus contains an extension bit, a coding standard, a bit for indicating the following of explicit instructions, a pass-along request bit, and IE action indicator bits. The bits "11" in field 905 are ATM Forum specific. The "1" bit in field 906 indicates that explicit instructions should be followed. The "1" bit in field 907 indicates a pass along request. The bit pattern "001" in field 909 indicates that the information element 900 can be discarded and then action can proceed.

Fields 1005 and 1007 comprise field 911 that indicates the length of the information element 900. Field 1009 corresponds to the field 913 that contains the value of the percentage utilization factor, which is the content being transported by information element 900. Field 1011 corresponds to field 915 that contains the decision-making factors.

For alternative embodiments of the invention, the percentage utilization factor could be transported between network nodes or switches either as a stand-alone packet (or cell) or as part of a protocol. The protocol could be either standards-based, proprietary, or some other type. For other embodiments of the invention, the percentage utilization factor is transported in other types of PNNI signaling messages besides the PNNI SETUP signaling message. For other embodiments, the percentage utilization factor is transported in other types of signaling messages besides PNNI signaling messages. For yet other embodiments, the percent utilization factor is carried in the message header of a PNNI signaling message either rather than (or in addition to) being carried in an information element of the PNNI signaling message.

Figure 11:
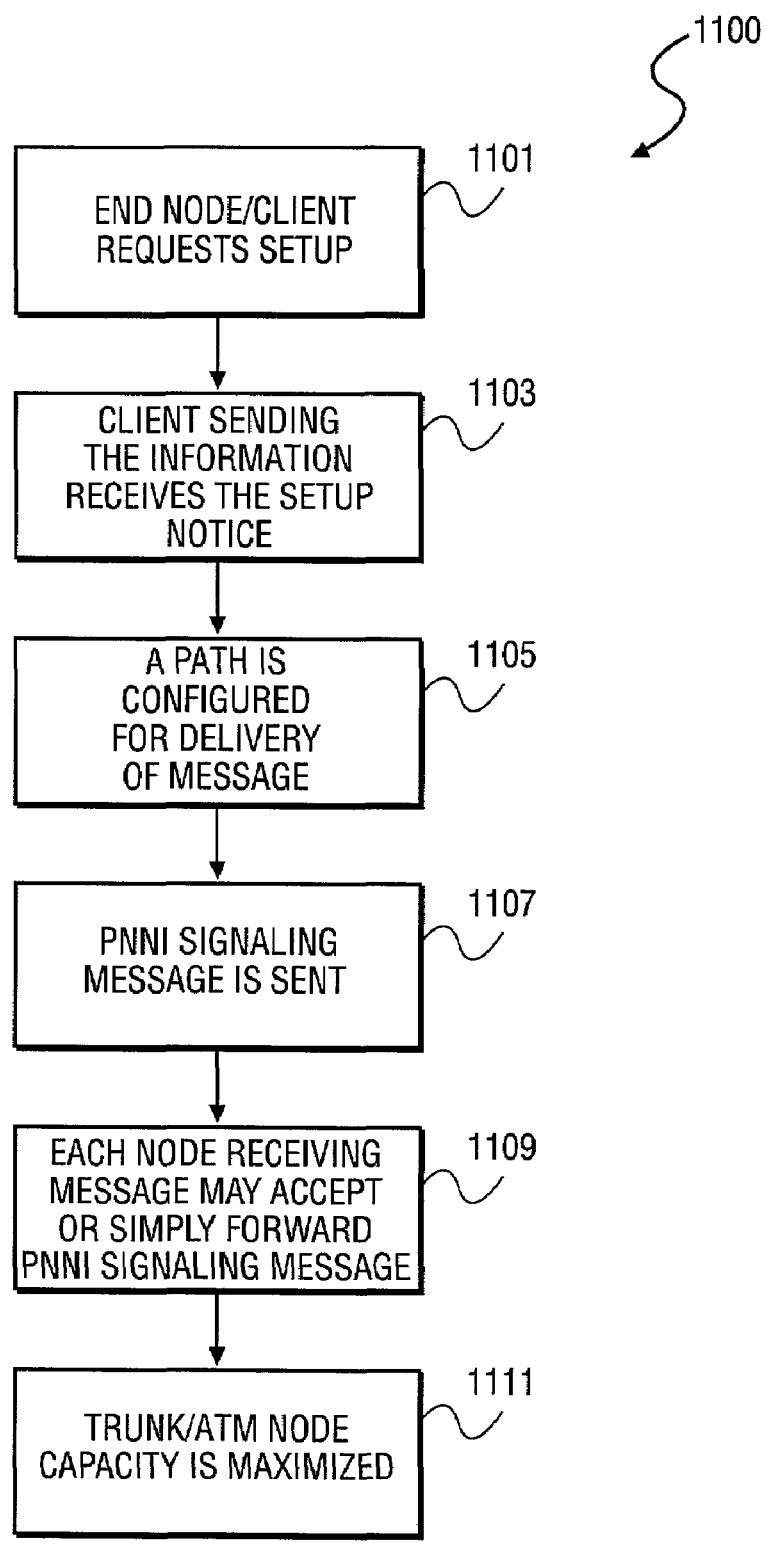
FIG. 11 is a flow chart of an operation for placing a call between two clients while maximizing the utilization capacity of trunks in the path of the call through an overbooking process according to one embodiment.

FIG. 11 is a flow chart of an operation 1100 for placing a call between two clients while maximizing the utilization capacity of trunks in the path of the call through an overbooking process that uses the percentage utilization factor value. Operation 1100 can be implemented on ATM network 100 using ATM signaling protocol stack 150.

At operation block 1101, a client requests a call setup or information from another client. The request is processed and communicated to the client able to provide the information and set up the call. Both clients may be either in a local peer group sharing similar network nodes or in separate hierarchical or multi-peer groups.

At operation block 1103, the client capable of sending the information or setting up the call receives the request from the client requesting the call setup. The request is processed by the receiving client for configuring availability of network resources for call setup. If both the requesting and sending client are in the same peer group, then the client sending the information configures a path through which the call may be routed. Alternatively, if the clients are in separate hierarchical network groups, then a path within the sending client's local peer group is configured to a point of hand-off to another peer group. The next peer group receives a call connection request and configures a path in its local network peer group for handing off to the next available peer group. The process continues until the final destination ATM node situated at the client requesting the call setup is contacted. Thus, a call path is configured.

At operation block 1105, the configuration results in a path determination for placing the call. The nodes within a local group on a single peer group or local groups within each local peer group in a hierarchical local group may also have crank-back features indicating lack of resources to place the call. In such case an alternative path is configured for call placement.

At operation block 1107, a PNNI signaling message with requested data is sent to the requesting client. For one embodiment, the PNNI signaling message is a PNNI SETUP signaling message that includes specific information such as the percentage utilization factor in addition to any other requested information that is supported by the sending client. The PNNI SETUP signaling message is then forwarded from node to node in the ATM network 100 along its path to the final destination—i.e., the requested client.

At operation 1109, the PNNI SETUP signaling message is sent through links from the initial/sending client to a node along the path of the requesting client. The ATM node receiving the PNNI SETUP signaling message is coupled to a particular type of trunk having a bandwidth capacity. Each receiving node along the call path may have the option of recognizing the PNNI SETUP signaling message or simply forwarding the PNNI SETUP signaling message to the node next in line in the call path. If a node does not support the coding standard in which the PNNI SETUP signaling message is encoded, then the node may simply pass along the PNNI SETUP signaling message without having to drop the call.

The PNNI SETUP signaling message configurations of embodiments of the invention provide an advantage by having the "pass-along request bit" field 607 or 907 in the protocol allowing nodes that typically would have dropped an unrecognized call to simply forward the call to the next node instead. If a node recognizes the coding standard, however, the node accepts the PNNI SETUP signaling message.

At operation 1111, the capacity of a node accepting the PNNI signaling message is maximized. Each node in the ATM network is coupled to a trunk having a certain capacity. In the call setup process, a client sending the information typically asks for the allocation of certain bandwidth to send the information. Statistically, however, clients do not at all times fully use the allocated bandwidth of the trunk, thereby wasting valuable network resources.

One solution is to allocate the bandwidth that has statistically been proven to be used by the sending client, that bandwidth being only a percentage of the requested bandwidth. This percentage for configuring each node in the path is sent as a percentage utilization factor in a PNNI SETUP signaling message and a node accepting the PNNI SETUP signaling message is automatically configured to allocate a certain percentage of the requested bandwidth. The percentage allocation is determined through statistical evaluations such as mathematical historic computations of a client's prior usage. The percentage utilization factor carried in the PNNI signaling message is a representation of the statistical usage and an accepting node is automatically configured to a new percentage utilization based on the percentage utilization factor found in the information element of the PNNI signaling message.

Alternatively, a node may also have the option of configuring its utilization capacity by either applying the percentage utilization factor in addition to the original allocated (or requested) bandwidth or ignore the percent utilization factor completely. This decision may be requested by the receiving client. PNNI signaling accomplishes automatic configuration of nodes for each call placed and alleviates the need to manually configure each node separately.

Thus, a way of providing connection-based bandwidth utilization has been described. Embodiments of the present invention may be implemented in software executed on a processing core (such as a signal processor or a central processing unit of a microprocessor or microcontroller) or otherwise implemented or realized upon or within a machine-readable medium. A machine-readable medium includes any mechanism for storing or transmitting information in a form readable by a machine (e.g., a computer or a switch). For example, a machine readable medium includes read-only memory ("ROM") random-access memory ("RAM"), magnetic disk storage media, optical storage media, flash memory devices, and electrical, optical, acoustical, or other form of propagated signals (i.e., carrier waves, infrared signals, digital signals, etc.), etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. In a connection-oriented networking environment, a method comprising:
   providing a connection between a plurality of clients using a plurality of nodes coupled together through a plurality of trunks; and
   automatically adjusting utilization capacity of the plurality of trunks using standards-based signaling, wherein the standards-based signaling is private network-to-network interface (PNNI) protocol signaling, and wherein a percentage utilization factor is part of a PNNI signaling message.

2. The method of claim 1, wherein the adjusting is performed for a call connection between a plurality of clients.

3. The method of claim 1, wherein the adjusting comprises assigning the percentage utilization factor.

4. The method of claim 1, wherein the PNNI signaling message is associated with a call placed between a plurality of clients.

5. The method of claim 1, wherein the percentage utilization factor is part of a general application transport information element that is part of a PNNI signaling message.

6. The method of claim 1, wherein the percentage utilization factor is part of a percentage utilization factor information element that is part of a PNNI signaling message.

7. The method of claim 1, further comprising overbooking a trunk to maximize utilization of the trunk capacity.

8. The method of claim 7, further comprising monitoring a trunk for determining the utilization capacity of the trunk.

9. The method of claim 8, further comprising varying a value of the percentage utilization factor for a subsequent call based on results obtained through the monitoring.

10. The method of claim 1, further comprising:
receiving a call setup request from a client;
evaluating a path in the networking environment for transmitting the requested call; and
transmitting the requested call over the evaluated path.

11. The method of claim 10, wherein transmitting further includes sending the percentage utilization factor in a standards-based signaling message along with the requested call.

12. The method of claim 10, wherein evaluating comprises selecting a path based on network resources available at the time of the call setup request from the client.

13. The method of claim 1, further comprising allowing a node in the network to make a decision as to whether or not to apply the percentage utilization factor transmitted in a standards-based signaling message.

14. The method of claim 13, wherein the decision by the node is to apply the percentage utilization factor in order to change bandwidth allocation.

15. The method of claim 13, wherein the decision by the node is to forward the call without applying the percentage utilization factor.

16. The method of claim 14, wherein the change in bandwidth allocation is based on the percentage utilization factor in addition to any preexisting bandwidth allocation.

17. The method of claim 14, wherein the change in bandwidth allocation comprises using the percentage utilization factor to override any preexisting bandwidth allocation.

18. In a switch of digital communications network, a method comprising:
establishing a connection with at least one other switch for a call with an amount of bandwidth allocated for the call, signaling a percentage utilization factor associated with the call;
using the percentage utilization factor to automatically reduce the amount of bandwidth allocated for the call.

19. The method of claim 18, wherein signaling a percentage utilization factor comprises sending a private network-to-network interface (PNNI) protocol signaling message containing the percentage utilization factor.

20. The method of claim 18, wherein the percentage utilization factor is based on statistics regarding trunk usage.

21. The method of claim 18, wherein the percentage utilization factor is based on a quality of service requested.

22. The method of claim 18, wherein the percentage utilization factor is automatically updated for a subsequent call.

23. The method of claim 22, wherein the automatic updating of the percentage utilization factor is based on statistics regarding monitored trunk usage.

24. A switch for a digital network, comprising:
means for establishing a connection with at least one other switch of the digital network via a trunk;
means to automatically adjust utilization capacity of the trunk of the network using a percentage utilization factor transported in a signaling message, wherein the signaling message is a private network-to-network interface (PNNI) signaling message, and wherein the percentage utilization factor is transported in an information element of the PNNI signaling message.

25. A switch for a digital network, comprising:
a processor to automatically adjust utilization capacity of a trunk of the network using a percentage utilization factor transported in a signaling message, wherein the signaling message is a private network-to-network interface (PNNI) signaling message, and wherein the percentage utilization factor is transported in an information element of the PNNI signaling message.

26. The switch of claim 25, wherein the PNNI signaling message is a PNNI setup signaling message.

27. The switch of claim 25, wherein the information element is a general application transport information element.

28. The switch of claim 25, wherein the information element is a percentage utilization factor information element.

29. The switch of claim 25, wherein the processor overbooks the trunk in the network to maximize utilization of trunk capacity.

30. The switch of claim 25, wherein the processor monitors the trunk to determine utilization capacity of the trunk.

31. The switch of claim 30, wherein the processor varies a value of the percentage utilization factor for a subsequent call based on results obtained through the monitoring of the trunk.

32. A computer readable storage medium having stored therein a plurality of machine executable instructions, wherein when executed on a switch in a digital network, the instructions perform a method comprising:
establishing a connection with at least one other switch for a call with an amount of bandwidth allocated for the call;
signaling a percentage utilization factor associated with the call; and using the percentage utilization factor to automatically reduce the amount of bandwidth allocated for the call, wherein the signaling message is a Private network-to-network interface (PNNI) signaling message, and wherein the percentage utilization factor is transported in an information element of the PNNI signaling message.

33. A computer readable storage medium having stored therein a plurality of machine executable instructions, wherein when executed, the instructions perform a method comprising:
providing a connection between a plurality of clients using a plurality of nodes coupled together through a plurality of trunks; and
automatically adjusting utilization capacity of the plurality of trunks using standards-based signaling, wherein the automatic adjusting of utilization capacity is based on a percentage utilization factor transported in a standards-based signaling message.

34. The storage medium of claim 33, wherein the standards-based signaling is private network-to-network interface (PNNI) protocol signaling.

35. The storage medium of claim 33, wherein the standards-based signaling message is a private network-to-network interface (PNNI) setup signaling message.

36. A network system comprising:
- means for providing a connection between a plurality of clients using a plurality of nodes coupled together through a plurality of trunks;
- means for automatically adjusting utilization capacity of the plurality of trunks using standards-based signaling; and
- means for transporting a percentage utilization factor by signaling the percentage utilization factor along with a call.

37. The network system of claim 36, wherein the percentage utilization factor is contained in a private network-to-network interface (PNNI) signaling message.

38. The network system of claim 37, wherein the PNNI signaling message is a PNNI signaling setup message.

39. The network system of claim 36, further comprising means for monitoring a trunk for determining a utilization capacity of the trunk.

40. The network system of claim 39, further comprising means for varying a value of the percent utilization factor for a subsequent call based on results obtained through the monitoring of the trunk.

41. The network system of claim 36, further comprising means for allowing a node to make a decision as to whether or not to apply the utilization factor signaled along with a call.

42. The network system of claim 36, further comprising means for changing a bandwidth allocation for a trunk based on the percentage utilization factor.

\* \* \* \* \*

UNITED STATES PATENT AND TRADEMARK OFFICE
CERTIFICATE OF CORRECTION

| | | |
|---|---|---|
| PATENT NO. | : 7,233,571 B1 | Page 1 of 1 |
| APPLICATION NO. | : 10/025265 | |
| DATED | : June 19, 2007 | |
| INVENTOR(S) | : Chandrasekar Krishnamurthy et al. | |

It is certified that error appears in the above-identified patent and that said Letters Patent is hereby corrected as shown below:

Title Page;
On page 1 (the cover sheet) at item (75) delete "Mahash Chellappa" and insert --Mahesh Chellappa--.

At column 5, line 28, delete "link 1B" and substitute --link B--.

Signed and Sealed this

Twenty-ninth Day of April, 2008

JON W. DUDAS
*Director of the United States Patent and Trademark Office*